Aug. 21, 1928.

H. G. WHITMORE

AWNING

Filed Aug. 10, 1927

1,681,757

Inventor

Horace G. Whitmore

By

Attorney

Patented Aug. 21, 1928.

1,681,757

UNITED STATES PATENT OFFICE.

HORACE G. WHITMORE, OF CHICAGO, ILLINOIS.

AWNING.

Application filed August 10, 1927. Serial No. 211,929.

The present invention relates to an automobile awning.

In driving, especially in summer, the direct rays of the sun entering a car are hard on the eyes, and, in addition, increase the heat in the interior of the car. To prevent the entrance of these direct rays various types of awnings have been designed, most of them using a fabric awning supported on some sort of metal frame work. Since there is considerable variation in the widths of the windows of different types of cars, it is desirable to provide adjustable fastening means for the awning to accommodate different widths of windows within certain limited ranges, and thus minimize as far as is practicable the number of sizes of awnings which it is necessary to provide in order to be able to supply the entire range of window sizes. The awning should be capable of being readily attached or detached without interfering with the normal functioning of the window when the device is in position. Also, especially in touring, it is desirable to have the awning constructed of material which, while it softens the sun's rays sufficiently to prevent discomfort, at the same time will be transparent enough to see through.

An object of the present invention is to make an improved and simplified automobile awning.

Another object is to provide an automobile awning having a transparent protective portion and having ventilating openings therein.

In order to attain these objects, there is provided in accordance with one feature of the invention, a supporting frame having adjustable mounting plates carried thereby, the frame being provided with ventilating openings therein.

These and other features of the invention will be more fully brought out in the following description and the accompanying drawings, wherein.

Figure 4:
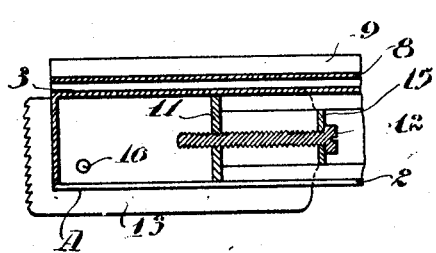
Figure 4, is a sectional view on the line 4—4 of Figure 1.

Referring to the drawings in detail, a sheet metal frame A comprises a vertical portion 1, a lower flange 2 bent to lie at right angles with the vertical portion 1, a top horizontal portion 3, and an angularly disposed, outwardly extending portion 4. A sheet of colored, transparent material, such as celluloid, is secured to the outwardly extending portion 4 of the frame by means of a plate 6 and screws 7 which penetrate the plate and the transparency 5 and are threaded into the outwardly extending portion 4 of frame to grip the transparency and hold it firmly in position. A horizontal portion 8 extends inwardly from the upper edge of the securing plate 6 and at its inner end is bent upwardly in the form of a flange 9. An elongated opening 10 is provided in each end of the vertical portion 1 of the frame A and other similar openings are provided at intermediate points, if additional ventilation is required. A vertical member 11 is affixed in position transversely of the frame, as shown in Figure 4, at the outer end of the ventilating opening 10. A threaded opening is provided in this member to receive a screw 12. A mounting plate 13 is provided with an elongated slot 14 extending longitudinally thereof, and an extension 15 of this plate is bent to lie at right angles with the plane of said plate and is provided with an opening of a size to freely receive the shank of the screw 12 therein. A screw 16 for locking the mounting plate 13 in an adjusted position rides in the slot 14 and has threaded engagement with the frame A.

Figure 1:
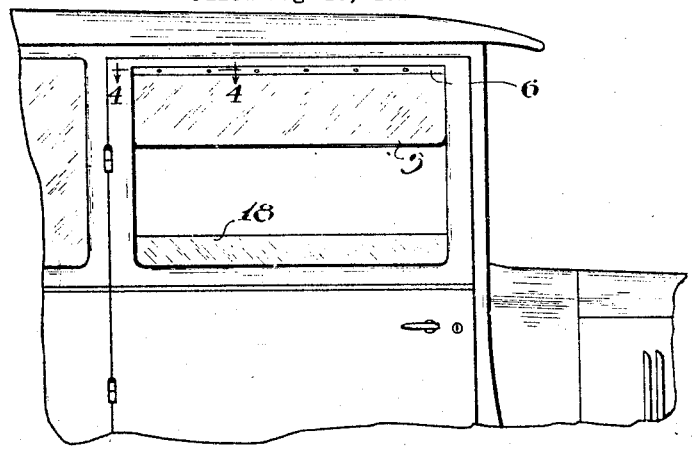
Figure 1, is a view in side elevation of an automobile window equipped with an awning made in accordance with the present invention.
Figures 2, 3:
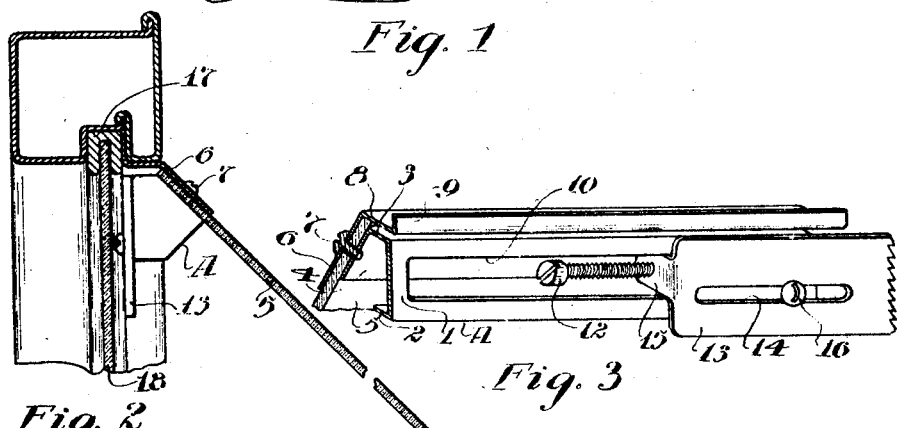
Figure 2, is a sectional view on the line 2—2 of Figure 1.
Figure 3, is a view in perspective of a portion of one end of an awning.
Figure 5:
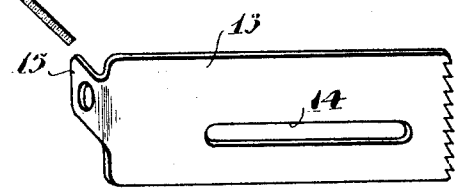
Figure 5, is a view in perspective of an adjustable mounting plate.

The operation of the device is as follows:

The screws 12 are screwed inwardly to permit the mounting plates to be moved inwardly sufficient to clear the inner edge of the window opening, the locking screws 16 being loosened to permit free sliding movement of the mounting plates. The flange 9 is then forced upwardly between the cushioned strip 17 in which the windows 18 of automobiles are customarily mounted to slide as shown in Figure 2. The screws 12 are then screwed to force the mounting plates 13 outwardly from the center of the window into the space between the cushioned strip 17 and the groove in which said cushioned strip is mounted so as to firmly engage the bottom of these grooves to hold the device firmly in position. The locking screws 16 are then screwed down to lock the mounting plates against displacement.

The device may be mounted either on the outer side of the cushioned strip 17, as shown in Figure 2, so as to permit fully closing the window, or with the flange 9 and the mounting plates 13 on the inner side of the cushioned strip 17, this position not being illustrated as it is apparent from Figure 2 how the device would operate in this position. In this latter case the window is prevented from fully closing, the upper edge of the window abutting against the inwardly turned flange 2 on the bottom of the frame A. This position is desirable, especially in winter driving, when a heater is installed in a car, since it permits sufficient ventilation through the opening 10 for the occupants of the car, and, at the same time, does not produce a chilling blast, as is caused by opening the window, since the awning partially deflects the air and prevents a direct stream of cold air from entering the car.

I claim:

1. An automobile awning of the character described, comprising a frame, a transparency carried by said frame and an adjustable mounting plate supported on either end of said frame, said mounting plate being adjustable by a screw having free turning engagement with said mounting plate and having threaded engagement with a portion of said frame to force the mounting plate outwardly into engagement with a window opening in which the device is installed to position the transparency at an acute angle with the plane of said window.

2. An automobile awning of the character described, comprising a supporting frame, a shield member connected thereto to project laterally outward and downwardly from said frame, a mounting plate slidably mounted on said frame and adjustable means connecting said mounting plate to said frame to move said mounting plate outwardly into engagement with a window opening to support said frame.

3. An automobile awning of the character described, comprising a supporting frame of sheet metal having a ventilating aperture therein and having a portion thereof disposed at an acute angle with respect to a vertical plane therethrough, a sheet of material connected to said angularly disposed portion to extend outwardly and downwardly therefrom, a mounting plate slidably mounted on said frame to have a portion thereof extensible beyond the end of said frame, and threaded means interconnecting said slidable member and said frame to force the ends of said mounting plate outwardly beyond the ends of said frame to grip a window opening and hold the device in position therein.

In testimony whereof I affix my signature.

HORACE G. WHITMORE.